United States Patent
Kuromusha et al.

(10) Patent No.: US 7,028,265 B2
(45) Date of Patent: Apr. 11, 2006

(54) WINDOW DISPLAY SYSTEM AND METHOD FOR A COMPUTER SYSTEM

(75) Inventors: Kenichi Kuromusha, Yamatokoriyama (JP); Tsuguhiro Aoki, Yamatokoriyama (JP); Ikuo Keshi, Nara (JP); Junko Nakagawa, Higashiosaka (JP); Kenichi Inui, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 598 days.

(21) Appl. No.: 09/906,858

(22) Filed: Jul. 18, 2001

(65) Prior Publication Data

US 2002/0026320 A1  Feb. 28, 2002

(30) Foreign Application Priority Data

Aug. 29, 2000 (JP) ............................. 2000-258418

(51) Int. Cl.
 *G06F 3/14* (2006.01)
(52) U.S. Cl. .................. 715/788; 715/799; 715/706; 715/804; 715/809; 715/709; 715/727
(58) Field of Classification Search ................ 345/788, 345/781, 791, 790, 794, 802, 799, 803, 804, 345/789, 796, 797, 798, 800, 809, 808, 706, 345/708, 709, 711, 715, 727, 728, 705
See application file for complete search history.

(56) References Cited

U.S. PATENT DOCUMENTS

| 5,657,462 A | * | 8/1997 | Brouwer et al. ............. 715/709 |
| 5,760,772 A | * | 6/1998 | Austin ......................... 345/798 |
| 5,808,610 A | * | 9/1998 | Benson et al. .............. 345/788 |
| 5,838,318 A | * | 11/1998 | Porter et al. ................. 345/790 |
| 5,977,973 A | * | 11/1999 | Sobeski et al. ............. 345/798 |
| 6,054,985 A | * | 4/2000 | Morgan et al. ............. 345/804 |
| 6,654,036 B1 | * | 11/2003 | Jones .......................... 345/798 |

FOREIGN PATENT DOCUMENTS

| JP | 10-55372 A | 2/1998 |
| JP | 2000-207085 | 7/2000 |

OTHER PUBLICATIONS

"Placement of Message Boxes Relative to Objects", IBM Technical Discolsure Bulletin, vol. 35, issue 1A, pp. 38-40, Jun. 1, 1992.*

* cited by examiner

*Primary Examiner*—Raymond J. Bayerl
(74) *Attorney, Agent, or Firm*—Nixon & Vanderhye, PC

(57) ABSTRACT

An example window display device on a window-system type computer system displays a main window and a sub-window. The window display device includes a sub-window moving mechanism for moving the sub-window in accordance with movement of the main window so that the sub-window may always keep a specified relative position with respect to the main window on a display screen.

20 Claims, 13 Drawing Sheets

FIG 4

| FUNCTION NAME | FUNCTION EXPLAINING TEXT | OPERATION PROCEDURE INSTRUCTION | ACTION SCRIPT |
|---|---|---|---|
| CENTERING | BRING CHARACTERS TO A CENTER OF A LINE | AFTER SPECIFYING A CHARACTER STRING, SELECT "CENTERING" FROM AN EDIT MENU | GetString_Agent( )<br>OpenMenu_Agent(HENSHUU)<br>Choose_Agent(CENTERING) |
| PRINT | PRINT A DOCUMENT BY A PRINTER | SELECT "PRINT" FROM A FILE MENU | OpenMenu_Agent(FILE)<br>Choose_Agent(PRINT) |
| SAVE | STORE A DOCUMENT IN A FILE | SELECT "SAVE" FROM A FILE MENU | OpenMenu_Agent(FILE)<br>Choose_Agent(SAVE) |
| ......... | ......... | ......... | ......... |

| ID | RESPONSE |
|---|---|
| 0 | I CANNOT UNDERSTAND |
| 1 | PLEASE SPEAK PLAINLY |
| 2 | DO YOU FEEL BAD WITH VOICE? |
| ⋮ | ⋮ |

FIG 7
(a)
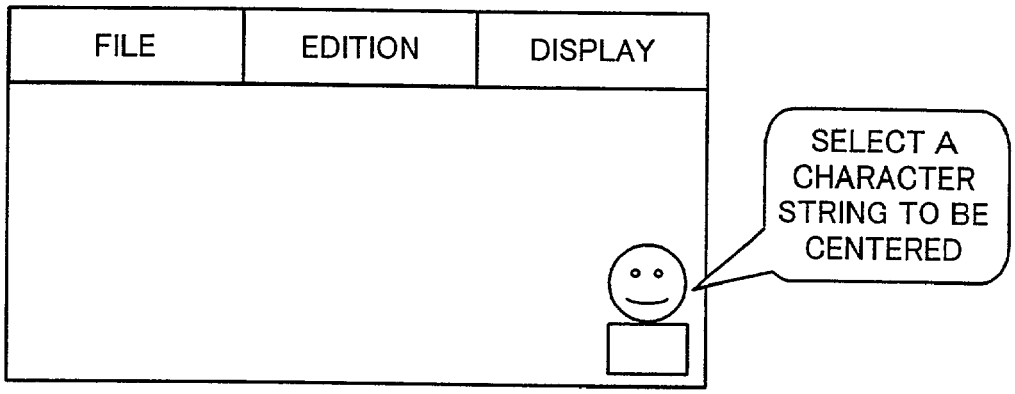
(b)
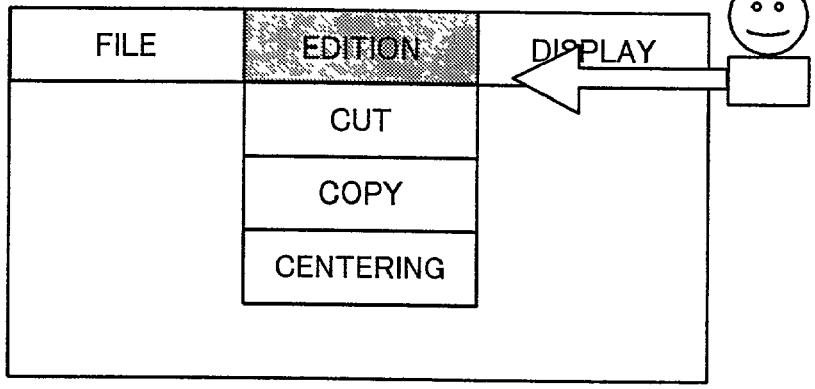
(c)
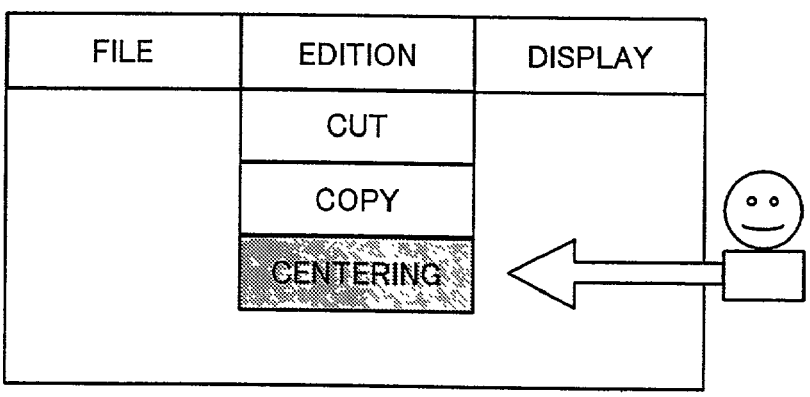

FIG 10

| ID | COMMAND | OPERATION TO BE PERFORMED |
|---|---|---|
| 0 | ONCE MORE | JUST FINISHED OPERATION EXPLANATION IS CARRIED OUT AGAIN |
| 1 | JUST THE SAME HELP | JUST FINISHED HELP IN OPERATION IS SEEN AGAIN |
| 2 | ONCE AGAIN BUT MORE SLOWLY | JUST FINISHED OPERATION EXPLANATION IS GIVEN AGAIN MORE SLOWLY |
| ......... | ......... | ......... |

WINDOW DISPLAY SYSTEM AND METHOD FOR A COMPUTER SYSTEM

BACKGROUND OF THE INVENTION

The present invention relates to an on-demand interface device with a window display, which executes a help function for assisting the user in operation and/or a function for performing automatic operation with a current application such as a computer application, office automatic apparatus and home electronic apparatus.

A variety of applications using the voice recognition function have been increasingly developed, most of which, however, are of the command driven type.

Japanese Laid-Open Patent Publication No. 2000-207085 discloses an on-demand interface device that displays on a screen an agent who is an impersonated character used for explaining how to operate the current application. This device receives a request text inputted by a user, retrieves suitable information from a database containing instructions or advices for operating the current application, and executes a script related to the retrieval result, causing the agent to explain the operation.

When a voice input application relies on, not a command, a dictation for inputting natural language, the voice recognition accuracy is decreased than that of command-relied system and the further processing is affected. While an enroll function provided by a voice recognition engine may improve the recognition accuracy, the concept of enrolling is not known itself to common users who hardly recognize in practice the fact that the application could not operate well due to the decreased accuracy of the voice recognition.

The application cannot be satisfactory used as far as the voice recognition accuracy is not improved. For example, whenever a user inputs a spoken request, the system may repeat the same response "I cannot understand", lowering the user's will to use the application.

For an application allowing the user to enter a command by using both a voice input means and a keyboard, the user may start inputting a speech by using a voice input button or a keyed command by pressing a key input button. However, a dialogue cannot be always displayed on a screen. In the application, any button cannot be displayed on the screen while an agent in shape of an impersonated character is displayed thereon. One of the solutions is to assign commands "voice input start" and "keyboard input start" to keys on the keyboard. However, there is a fear of confusing users in using two similar keys.

In case of explaining how to operate the current application by the agent being always displayed on a screen, it is unclear when the explanation is finished. Therefore, it is desirable to cause the agent to appear at the beginning of explanation and disappear at the end of explanation.

With an interface using only an agent explaining the operation method without a dialogue indicating retrieved results, there may be such a problem that, when the user wants to hear again the same explanation by the agent, he/she must enter the same instruction to cause the system to repeat the same retrieval operation. This interface may draw the attention of the user to the agent and hence cause the user to pass over other indication such as a retrieve object mode, a volume level of a voice input, an edit box of a keyboard input, which may be displayed on specified positions or in separate windows on a screen irrespective of the agent.

There is still left such a problem that the user who is first use the on-demand interface may be puzzled what to do next after turning on the interface device itself.

SUMMARY OF THE INVENTION

In view of the above states of the prior art, the present invention is directed to an on-demand interface device that is easy to operate and effectively assist the user on how to operate the current application.

This application describes an example window display device for a window-system type computer system. The window display device displays a main window movable by a user and at least a sub-window. The window display device moves the sub-window in accordance with movement of a main window so that the sub-window may always keep a specified relative position with respect to the main window on a display screen.

The present application further describes this feature, as well as other illustrative example features, as identified below.

(2) Another object of the present invention is to provide an on-demand interface device comprising a voice input means for inputting a user's speech, a voice recognizing means for recognizing the user's speech inputted by the voice input means, a database containing information to be retrieved, a retrieval means for retrieving information from the database by using a request instruction obtained as a result of speech recognition by the voice recognizing means, and an output means for outputting a retrieval result obtained by the retrieval means, characterized in that it is further provided with a fail-in-retrieval response database containing a plurality of response texts to report the user that nothing was obtained by the retrieval means, and a fail-in-retrieval output means for randomly selecting and outputting one of texts contained in the fail-in-retrieval response database if nothing was obtained by the retrieval means.

(3) Another object of the present invention is to provide an on-demand interface device as defined in the item (2), characterized in that it is further includes a fail-in-retrieval count memory means for storing whether a fail-in-retrieval response from the fail-in-retrieval response database was output by the fail-in-retrieval output means on completion of retrieval by the retrieval means, and a voice recognition adjustment advising means for advising the user to check and adjust the voice input means if output of the fail-in-retrieval response from the fail-in-retrieval response database was stored n times in succession on the fail-in-retrieval count memory means.

(4) Another object of the present invention is to provide an on-demand interface device comprising a voice input means for inputting a user's speech, a voice recognizing means for recognizing the user's speech inputted by the voice input means, a request text input means for inputting a request text by using an input method other than the voice input means, an input-mode memory means for storing input mode selected for inputting through the voice input means or the request text input means, characterized in that it is further provided with an input starting means for accepting a user's voice input through the voice input means or a user's request text input through the request text input means according to the mode stored in the input mode memory means.

(5) Another object of the present invention is to provide an on-demand interface device comprising an input means for accepting a user's request text, a function database containing function scripts to execute respective functions, a retrieval means for retrieving data from the function database according to the request text inputted by the user through the input means, an output means for outputting a retrieval result obtained by the retrieval means, a selecting means for selecting a function script desired by the user from the retrieval result outputted by the output means, a function executing means for executing the function script selected by the selecting means, and an agent outputting means for displaying an impersonated character-agent on a screen coincidently with beginning the execution of the selected function script by the function executing means, characterized in that it is further provided with an agent position memory means for storing the position of the agent before execution of the function script by the function executing means, and an agent position returning means for replacing the agent to the position recorded on the agent position memory means after the execution of the function script by the function executing means.

(6) Another object of the present invention is to provide an on-demand interface device comprising an input means for accepting a user's request text, a function database containing function scripts to execute respective functions, a retrieval means for retrieving data from the function database according to the request text inputted by the user through the input means, an output means for outputting a retrieval result obtained by the retrieval means, and a selecting means for selecting a function script desired by the user from the retrieval result outputted by the output means, characterized in that it is further provided with a memory means for storing the function script selected by the selecting means, a command database containing commands for identifying corresponding processing functions other than retrieval function by the retrieval means, and a command executing means for performing a particular processing, not retrieval of a function by the retrieval means, in accordance with the content of the function script stored in the memory means when the request text inputted by the input means corresponds to the command included in the command database.

(7) Another object of the present invention is to provide a window display device on a window-system type computer system, for displaying a main window capable of being shifted by a user and autonomously moving according to a program and displaying at least a sub-window, characterized in that it is further provided with a sub-window moving means for moving the sub-window in accordance with movement of a main window so that the sub-window may always keep a specified relative position in respect to the main window on a display screen.

(8) Another object of the present invention is to provide a window display device as defined in the item (7), characterized in that it is provided with a timer means for generating an interruption signal at specified time intervals to cause the sub-window moving means to move the sub-window to a specified position in respect to the current position of the main window according to the main window's position data obtained simultaneously with occurrence of the interruption.

(9) Another object of the present invention is to provide a window display device as defined in the item (7) or (8), characterized in that it is provided with a sub-window movement setting means capable of setting each of the sub-windows not to move.

(10) Another object of the present invention is to provide a window display device as defined in the item (7) or (8), characterized in that it is provided with a sub-window display setting means capable of setting each of the sub-windows not to be displayed.

(11) Another object of the present invention is to provide a window display device as defined in the item (7) or (8), characterized in that it is provided with a sub-window display position correcting means for correcting a position of the sub-window to be presented within a effective area of a display screen if the sub-window moved over a boundary of the display screen.

(12) Another object of the present invention is to provide a window display device as defined in the item (11), characterized in that it is provided with a main/sub-window position correcting means for correcting a position of the sub-window so as not to overlap the main window if the sub-window moved to overlap the main window on a display screen.

(13) Another object of the present invention is to provide a window display device as defined in the item (11), characterized in that it is provided with a sub/sub-window position correcting means for correcting positions of the sub-windows so as not to overlap each other if they moved to overlap each other.

(14) Another object of the present invention is to provide a window display device as defined in the item (11), characterized in that it is provided with a sub-window display priority setting means for setting display priorities of the main window and the sub-windows, and a display-priority changing means for changing the display priorities of the windows according to the display priorities set by the sub-window display priority setting means, when the main window and each of the sub-windows were overlapped each other.

(15) Another object of the present invention is to provide a window display device as defined in the item (7) or (8), characterized in that it is provided with a total area reduction/sub-window position correcting means for correcting position of the sub-window to be laid on the main window so as to reduce a total display area of the main-window plus the sub-window.

(16) Another object of the present invention is to provide a window display device as defined in the item (7) or (8), characterized in that it is provided with a sub-window display area reduction/sub-window position correcting means for correcting positions of the sub-windows as laid on one another so as to reduce a total display area of the sub-windows.

(17) Another object of the present invention is to provide a window display device as defined in the item (7) or (8), characterized in that it is provided with a sub-window front (forward)-displaying means for displaying the sub-window in front of the screen image not to be hidden under a window other than the main window and another sub-window.

(18) Another object of the present invention is to provide a window display device as defined in any one of the items (7) to (17), characterized in that the main window is an impersonated character-agent output means and the sub-window is a status output means for outputting a status representing a current state of, e.g., the retrieval mode.

(19) Another object of the present invention is to provide a window display device as defined in any one of the items (7) to (17), characterized in that it is provided with a voice input means for inputting a user's speech, and the main window is an output means for outputting an impersonated character-agent and the sub-window is a voice level output means for indicating a volume level of a speech inputted by the voice input means.

(20) Another object of the present invention is to provide a window display device as defined in any one of the items (7) to (17), characterized in that the main window is an output means for outputting an impersonated character-agent and the sub-window is an input request-text display means for displaying a content of the input request-text and a input cursor so that the user can input the request text in stead of the voice input means.

(21) Another object of the present invention is to provide an on-demand interface device comprising a voice input means for inputting a user's speech, a voice recognizing means for recognizing the user's speech inputted by the voice input means, a database containing information to be retrieved, a retrieval means for retrieving information from the database by using a request text obtained as a result of speech recognition by the voice recognizing means, an output means for outputting a retrieval result obtained by the retrieval means, and a selecting means for selecting a user's desired one from the retrieval result outputted by the output means, characterized in that it is further provided with a memory means for storing a selection result or a non-selection result obtained by the selecting means and a voice input instruction display means for outputting an explanation on how to use the voice input means to the output means if non-selection from information stored in the memory means was made n times in succession.

(22) Another object of the present invention is to provide an on-demand interface device as defined in the item (2), characterized in that it is further provided with a fail-in-retrieval count (number) memory means for storing a result of examination on whether a fail-in-retrieval response from the fail-in-retrieval response database was output by the fail-in-retrieval output means on completion of retrieval of information by the retrieval means, and a voice-input instruction display means for outputting an explanation on how to use a voice-input means to the output means if the fail-in-retrieval response was outputted n times in succession to the fail-in-retrieval count memory means.

(23) Another object of the present invention is to provide an on-demand interface device comprising a voice input means for inputting a user's speech, a voice recognizing means for recognizing the user's speech inputted by the voice input means, a database containing information to be retrieved, a retrieval means for retrieving information in the database by using a request text obtained as a result of speech recognition by the voice recognizing means, and an output means for outputting a retrieval result obtained by the retrieval means, characterized in that a voice input requesting means is further provided for outputting a message requesting a user to input an instruction if the user did not input a speech for a specified period.

(24) Another object of the present invention is to provide an on-demand interface device as defined in the item (23), wherein the voice input requesting means outputs an input requesting message if no voice was input through the voice input means for a specified period after turning on the on-demand interface device.

BRIEF DESCRIPTION OF THE DRAWINGS

FIG. 4 illustrates an exemplary content of a function database DB8.

FIG. 7 illustrates an exemplary explanation of functions by an on-demand voice interface device of the present invention.

FIG. 10 illustrates an exemplary content of a command database DB10.

PREFERRED EMBODIMENT OF THE INVENTION

Preferred embodiments of the present invention will be described below with reference to accompanying drawings.

Figure 1:
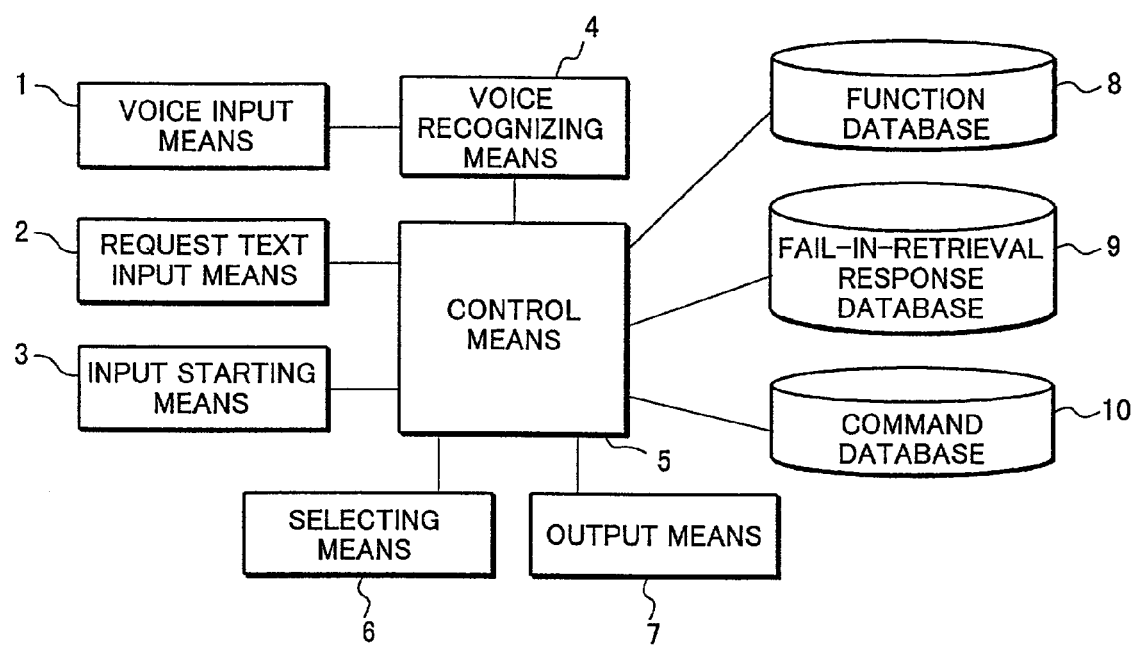
FIG. 1 is a schematic construction view of an on-demand interface device according to an aspect of the present invention.

FIG. 1 schematically illustrates a voice on-demand interface device according an embodiment of the present invention. This voice on-demand interface device comprises a voice input means 1 (e.g., a microphone) for vocally inputting a retrieval request and an instruction by a user, a request text input means 2 (e.g., a keyboard) for inputting a retrieval request and an instruction not vocally by the user, an input starting means 3 for informing a control means 5 of starting inputting a retrieval request and a user's instruction through the voice input means 1 and request text input means 2, a voice recognizing means 4 for recognizing a speech inputted by the voice input means 1, a control means 5 for controlling the voice on-demand interface device, a selecting means 6 for selecting a user's desired item from the result outputted by the output means 7, an output means 7 (e.g., a display and a speaker) for outputting a result of retrieval from a function database 8 according to a request text inputted through the voice input means 1 or the request text input means 2, an impersonated character (agent) on a display screen and a speech, a function database 8 containing scripts of help explanations and operation steps for an apparatus in which the voice on-demand interface device is used, a fail-in-retrieval response database 9 containing massages to be output to the output means 7 if a retrieval result for a request text inputted through the voice input means 1 or the text input means 2 is zero and scripts of actions of the agent, and a command database 10 containing commands to instruct the control means 5.

The voice input means 1 may also serve as the selecting means 6 and the request text input means 2 may also serve as the input start means 3 and the selecting means 6. The function database 8, the fail-in-retrieval response database 9 and the command database 10 may be stored in an external storage connected to the control means 5 or stored in separate storages or storages provided on a network.

Figure 2:
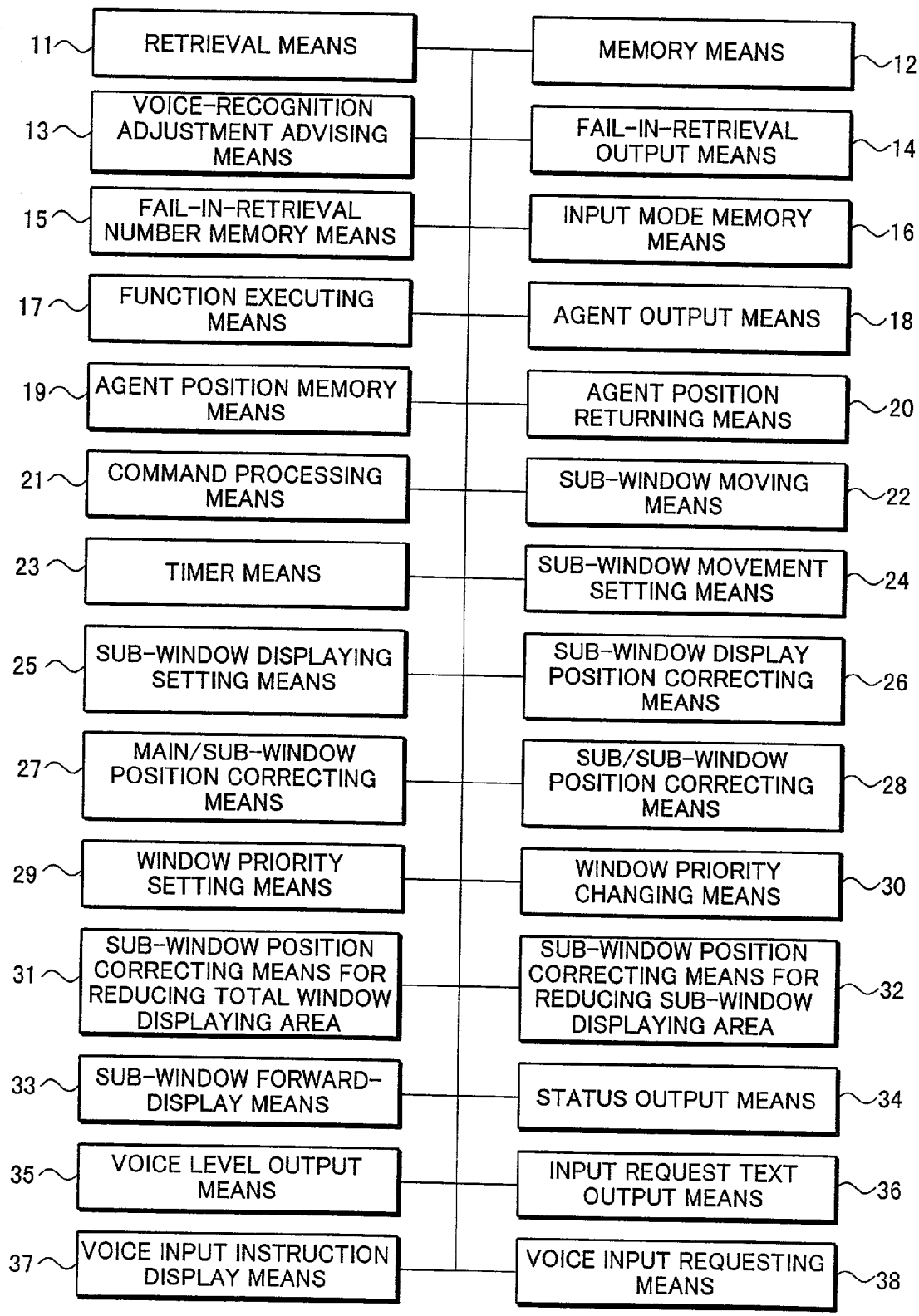
FIG. 2 is a schematic construction view of an exemplary control means 5.

FIG. 2 is a schematic view of an exemplary control means 5. This control means 5 comprises a retrieval means 11 for retrieving data from the database 8, a memory means 12 for storing what a user selected by the selecting means 6 from retrieval results obtained by the retrieval means 11, a voice recognition adjustment advising means 13 for advising the user to adjust the voice recognizing means 4 if he/she didn't select any of retrieval results n times in succession, which record is stored on the memory means 12, a fail-in-retrieval output means 14 for outputting a response randomly selected from the fail-in-retrieval response database 9 to the output means 7 when nothing (zero) was retrieved by the retrieval means 11, a fail-in-retrieval number memory means 15 for storing the number of "zero" results (fails) of retrieval operations made by the retrieval means 11, an input mode memory means 16 for storing the result of examination on whether user's request text or instruction was input in the voice input mode, a function executing means 17 for executing a function that the user has selected by the selecting means 6 from the results of retrieval made by the retrieval means 11 from the function database 8, an agent output means 18 for outputting an agent (impersonated character) to the output means 7, an agent position memory means 19 for storing a current position of the agent being output by the output means 18 on a display screen, an agent position returning means 20 for changing the position of the agent being outputted by the agent output means 18, a command processing means 21 for processing a command when a request text inputted by the voice input means 1 or the request text input means 2 coincides with one of commands stored in the command database 10, a sub-window moving means 22 for moving at least one sub-window in accordance with the movement of a main window output by the output means 7, a timer means 23 for interrupting the control means 5 at specified time intervals, a sub-window movement setting means 24 for setting each sub-window to be movable or unmovable by the sub-window moving means 22, a sub-window displaying setting means 25 for setting each sub-window to be presentable and non-presentable when being moved by the sub-window moving means 22, a sub-window display position correcting means 26 for correcting a current position of any one of the sub-windows on a display screen so as to display the sub-window within the display screen of the output means 7 if it was shifted out of the screen by the sub-window moving means 22, a main/sub-window position correcting means 27 for correcting a current position of each of sub-windows with respect to the main window to eliminate an overlap between the sub-window and the main window on the display screen of the output means 7 if such occurred due to shifting the sub-window by the sub-window moving means 22, sub/sub-window position correcting means 28 for correcting a current position of one sub-window with respect to another sub-window to eliminate an overlap between them on the display screen of the output means 7 if such occurred due to shifting the former by the sub-window moving means 22, a window priority setting means 29 for setting displaying priorities of the main widow and the sub-windows to be displayed as laying on one another in the downward order when shifting each sub-window by the sub-window moving means 22 on the display screen of the output means 7, a window priority changing means 30 for changing the displaying priorities of the main and each sub-windows laid on one another according to the priorities set by the window priority setting means 29 on the display screen of the output means 7, a total window display area reduction/sub-window position correcting means 31 for correcting the current positions of the sub-windows moved thereto by the sub-window moving means 22 so as to reduce a total display area of the main and sub windows on the display screen of the output means 7, a sub-window display area reduction/sub-window position correcting means 32 for correcting the positions of the sub-windows moved thereto by the sub-window moving means 22 so as to reduce a total display area of the sub-windows on the display screen of the output means 7, a sub-window front-display means 33 for displaying each sub-window in front of the display screen of the output means 7 not to be hidden under a window other than the main window and sub-windows, a status output means 34 for outputting a mode of retrieval operation of the retrieval means 11 to the display screen of the output means 7, a voice level output means 35 for outputting a volume level of a speech inputted by the voice input means 1 to the display screen of the output means 7, an input request text output means 36 for displaying a character string inputted by the request text input means 2 and a cursor on the display screen of the output means 7, a voice input instruction display means 37 for outputting an explanation on how to input an information by the voice input means 1 to the display screen of the output means 7 when the user did not select any of retrieval results n times in succession based on the data stored in the memory means 12, and a voice input requesting means 38 for outputting to the display screen of the output means 7 an message requesting the user of any vocal instruction through the voice input means 1 if no input through the voice input means 1 was received for a specified period.

The embodiments of the items (1) to (3) of the present invention are first described below.

Figure 3:
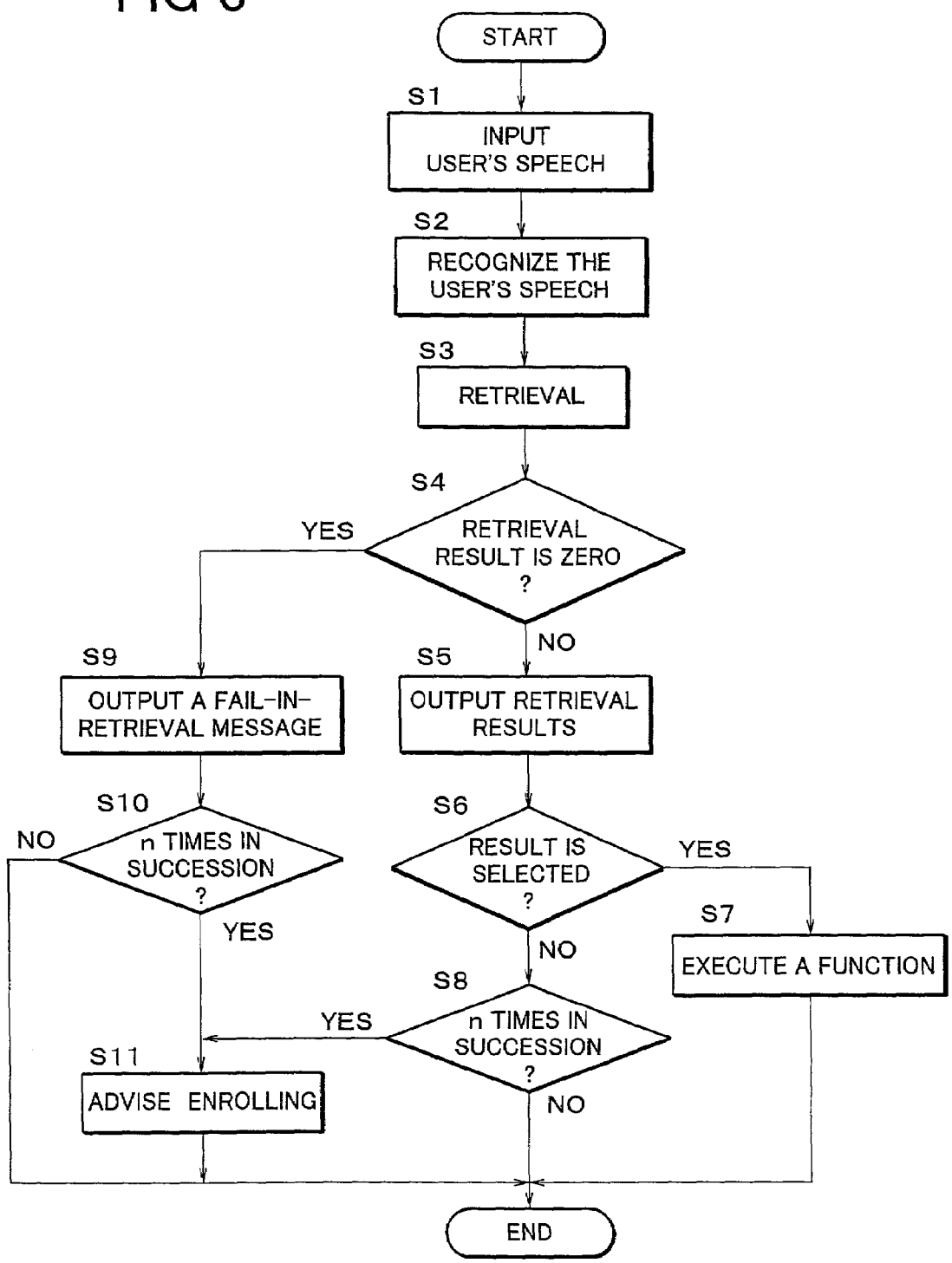
FIG. 3 is a flowchart depicting a procedure for a voice recognition adjustment advising means and a fail-in-retrieval output means.

FIG. 3 is a flowchart depicting an exemplary procedure of processing data by the voice recognition adjustment advising means 13 and the fail-in-retrieval output means 14. The user vocally enters through the voice input means 1 a retrieval requesting text for retrieval of a function from the function database 8 (Step S1). FIG. 4 illustrates an exemplified function database 8. Function names and summaries are objective character strings. Operation procedures and action scripts are used by the function executing means 17 when executing respective functions and by the agent output means 18 when explaining the operation by the agent. The request text inputted through the voice input means 1 is converted by the voice recognizing means 4 to a character string (Step S2). The converted character string is transferred to a control means 5 that in turn causes the retrieval means 11 to search for the character string in the function database 8 (Step S3). Now let assume that the result of voice recognition by the voice recognizing means 4 was "Document". The retrieval means 11 searches data in the function database 8 and outputs the retrieval result to the output means 7 to display the following message (Step S5):

Select a function to be executed.

1. Print
2. Save

When "1" was inputted by the user using the selecting means 6 (Step S6), the control means 5 drives the function executing means 17 and the agent output means 18 to carry out the "print" function (Step S7) and then stores the executed event in the memory means 12. When a response is "nothing" (Step S6) and the next retrieval was conducted (Step S3), the control means 5 stores non-executed event in the memory means 12. The content of the memory means 12 is as follows:

"Centering",

"Save",

"Non execution"

When the number of successively non-executed events stored in the memory means 12 reached n times (Step S8), the control means 5 caused the voice recognition adjustment advising means 13 to advise the user to adjust the voice recognizing means 4 through the output means 7 (Step S11). For example, if the non-executions were successively counted 5 times in the memory means 12, the control means 5 causes the voice recognition adjustment advising means 13 to advise the user to enroll the voice recognizing means 4 by displaying the following messages on the output means 7.

"Your speech may not correctly be recognized."

Figures 5, 6:
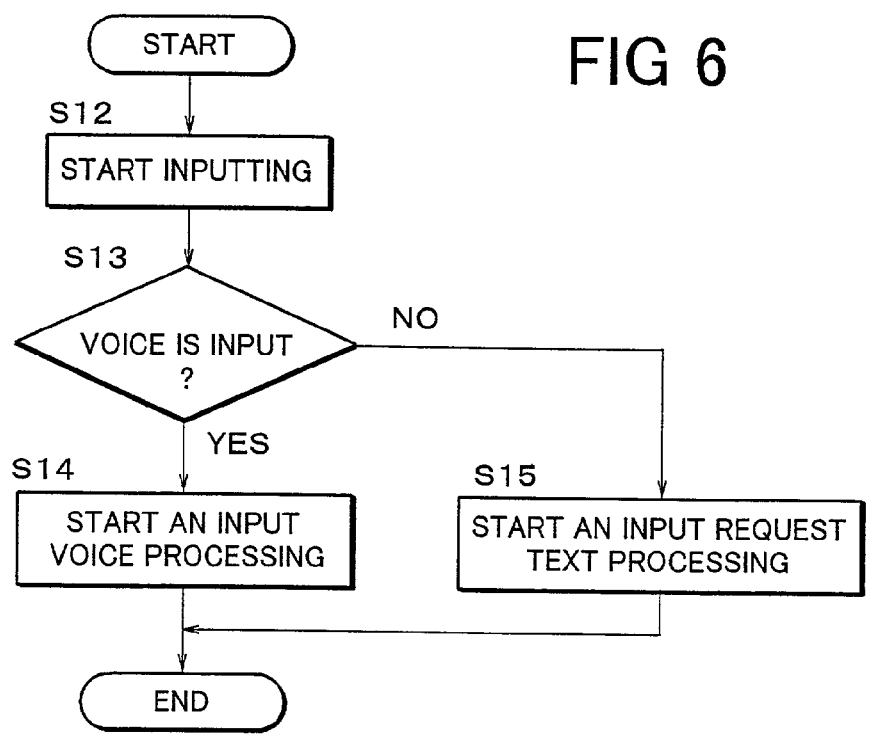
FIG. 5 illustrates an exemplary content of a fail-in-retrieval response database DB9.
FIG. 6 is a flowchart depicting the processing operations of an on-demand interface device according to an aspect (the item (4)) of the present invention.

"Do you want to enroll the voice recognition engine?" When the retrieval made by the retrieval means 11 according to the before mentioned process (Step S3) resulted in obtaining "zero" (nothing)(Step S4), the control means 5 causes the fail-in-retrieval output means 14 to refer to the fail-in-retrieval response database 9 and output a fail-in-retrieval message to the display screen of the output means 7 (Step S9). FIG. 5 illustrates an exemplary fail-in-retrieval response database 9. When the retrieval result was "zero", the fail-in-retrieval output means 14 randomly selects a response from the database 9 and outputs it on the display screen of the output means 7:

"Are you feeling wrong with voice?"

The zero-result of retrieval by the retrieval means 11 is recorded in the fail-in-retrieval count memory means 15 for example as follows:

8

10

0

The voice recognition adjustment advising means 13 monitors the number of the failed retrievals stored in the memory means 15. When the number of successively zero-retrieval results stored in the memory means 15 reached n times (Step S10), the voice recognition adjustment advising means 13 advises the user to adjust the voice recognizing means 4 via the output means 7 (Step S11). For example, if the zero-retrieval results were counted 5 times in succession, the voice recognition adjustment advising means 13 advises the user to enroll the voice recognizing means 4 by displaying the following messages on the display screen of the output means 7.

"Your speech may not correctly be recognized."

"Do you want to enroll the voice recognition engine?"

In the embodiments of the items (21) and (22) of the present invention, the voice input instructing means 37 instead of the voice recognition adjustment advising means 13 is used for explaining the user how to vocally input an instruction through the voice input means 1 in case of non-execution or zero-retrieval having occurred "n" times in succession. For example, if non-execution of functions occurred five times in succession, the voice input instructing means 37 outputs an explanation of how to input a speech on the display screen of the output means 7 as follows:

To input your speech, press the input start button and speak "I want to Enlarge characters".

The voice input instructing means 37 may also be used for explaining functions stored in the function database 8, displaying an exemplary screen image representing the state of executing a function selected from the function database 8 and presenting the help for the voice on-demand interface device.

An embodiment of the item (4) of the present invention is described with reference to FIG. 6 where a relevant flowchart is shown.

A request for retrieving information from the function database 8 can be input in a voice input mode (through the voice input means 1) or in a non-vocal input mode (through the request text input means 2). The selected input mode is stored in the input mode memory means 16. At the beginning of inputting a request, a start signal is first sent to the input starting means 3 (Step S12). The selected input mode is examined referring to the input mode memory means 16 (Step S13). When the voice input mode was selected, the request is input through the voice input means 1. When the non-vocal input mode was selected, the request is input through the request text input means 2 (Step S15). For example, when the user pressed the input start button provided as the input starting means 3, the input of a request text is ready to start either in the voice input mode or non-vocal mode depending on the selection stored in the input mode memory means 18. In the non-vocal mode, a dialogue for inputting characters is displayed on the display screen of the output means 7.

Figure 8:
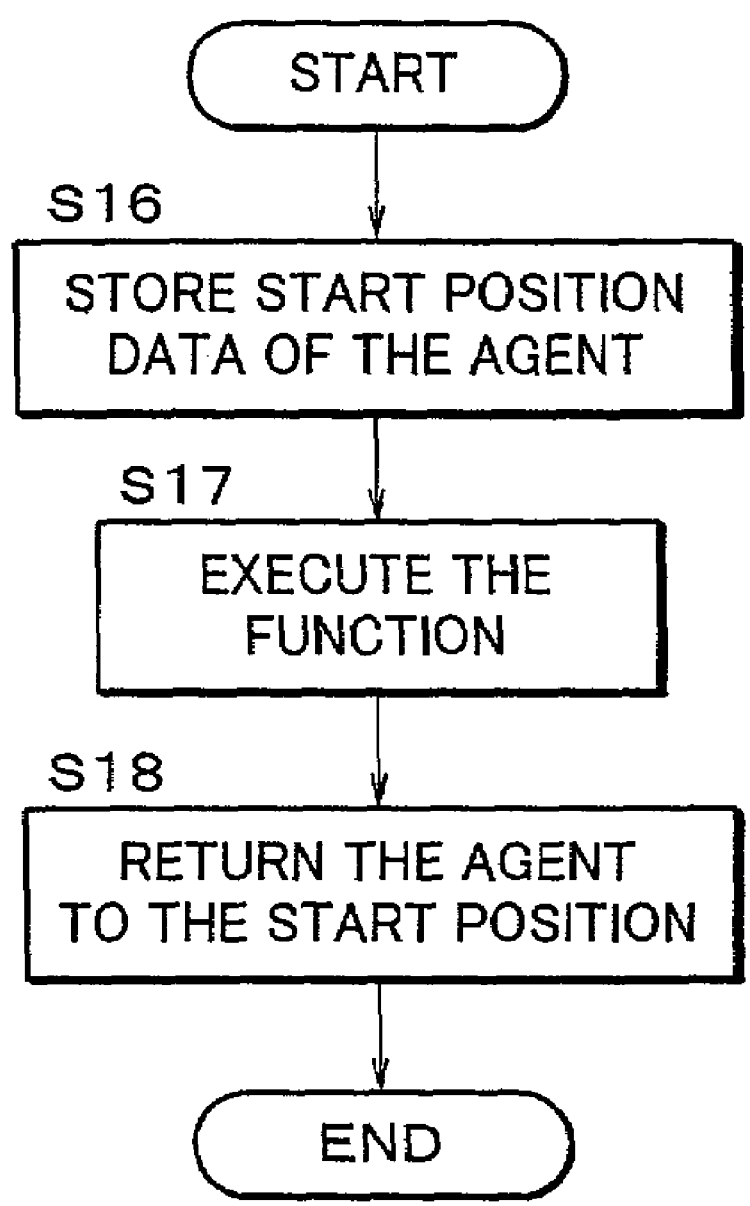
FIG. 8 is a flowchart depicting the processing operations of an on-demand interface device according to an aspect (the item (5)) of the present invention.

An embodiment of the item (5) of the present invention is described as follows:

FIG. 7 illustrates an example of how to explain a function by the voice on-demand interface device of the present invention. In this case, the embodiment uses the function database 8 shown in FIG. 4 and selects a "centering" function therein to be executed. In accordance with an action script, the function executing means 17 executes the function and the agent output means 18 outputs an agent to the output means 7. In the shown case, the agent instructs the user to select a character string to be centered, then moves vertically on the display screen to indicate selectable position "centering" function in an "edit" menu. The flowchart of FIG. 8 depicts an exemplary procedure for the shown embodiment (the item (5)) of the present invention. First, the agent position memory means 19 stores coordinates of an initial current position of the agent on the display screen of the output means 7 (Step S16). According to the above-described procedure, the agent explains what to do (Step S17). On completion of the explanation by the agent, the agent position returning means 20 refers to the coordinates stored in the agent position memory means 19 and returns the agent to the initial position where the agent was before starting movement (explanation) (Step S18). In the shown case, the agent moves to explain what to do and select to execute "centering" as shown in (b) and (c) on FIG. 7, then returns to the initial position (where it was before moving) as shown in (a) on FIG. 7.

Figure 9:
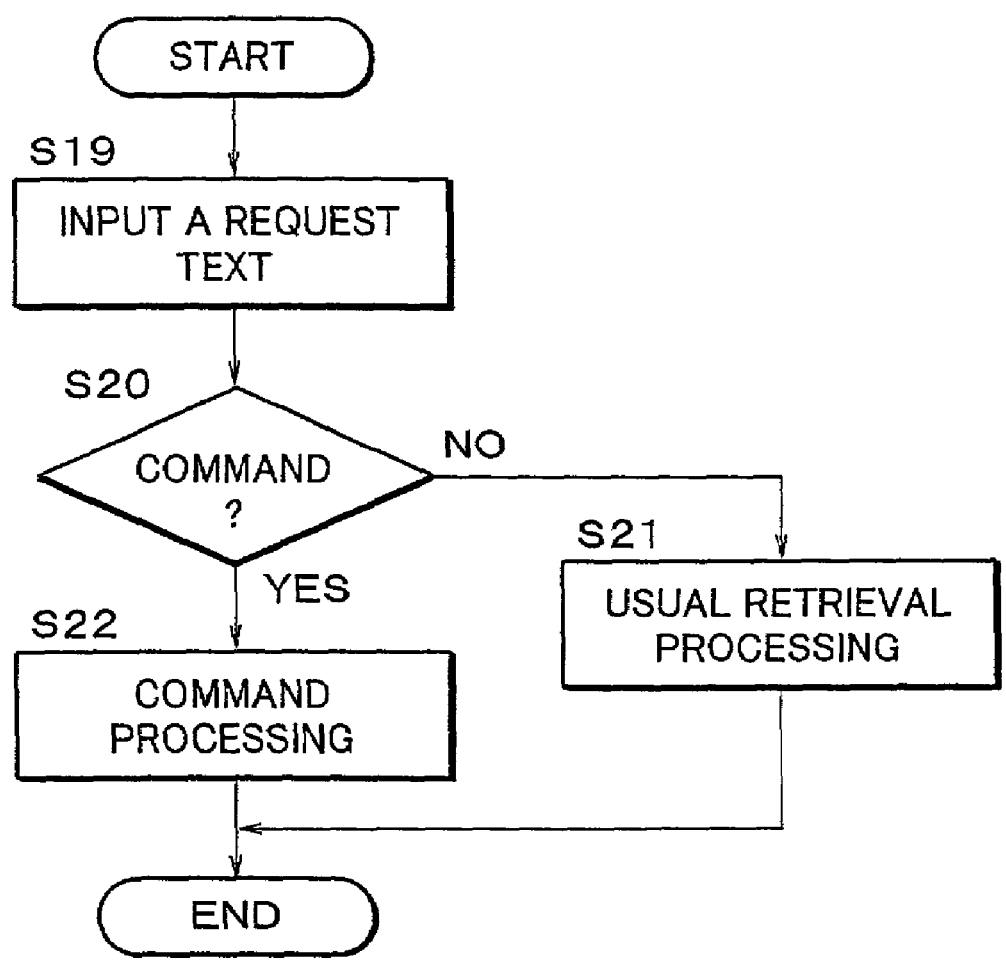
FIG. 9 is a flowchart depicting the processing operations of an on-demand interface device according to an aspect (the item (6)) of the present invention.

An embodiment according to the item (6) of the present invention is described with reference to FIG. 9 where a flowchart depicting the procedure for the embodiment.

A request text is inputted through the voice input means 1 or the request text input means 2 (Step S19) and then transferred to the command processing means 21 whereby the request text is examined whether it corresponds to one of commands stored in the command database 10 (Step S20). If the request text didn't correspond to every command in the database 10, the retrieval means 11 is driven to carry out the retrieval operation (Step S21). When the request text corresponds to a command in the database, the command processing means 21 performs the operation specified by the command (Step S22). An exemplary content of the command database 10 is shown in FIG. 10. For example, when a request text "Once more" was inputted, it is recognized as a command and the operation specified by the command is executed. In this case, the just finished explanation is conducted again. Other commands may be provided for example for presenting a help for just finished instruction, repeating again the just finished explanation but more slowly and so on.

Figure 11:
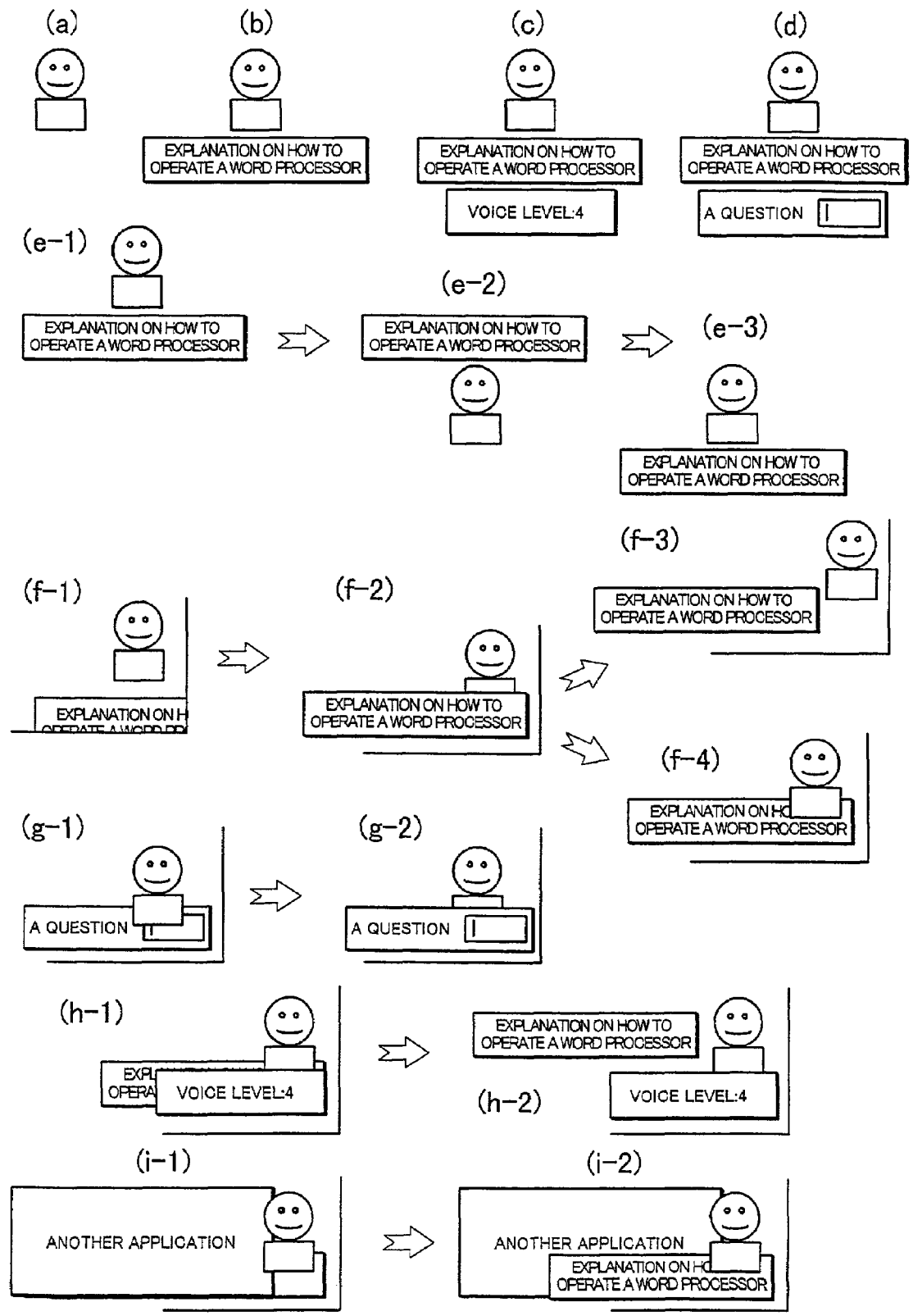
FIG. 11 illustrates how to display an agent, a retrieval mode, a voice level and a request-text edit box on a voice on-demand interface device of the present invention.
Figure 12:
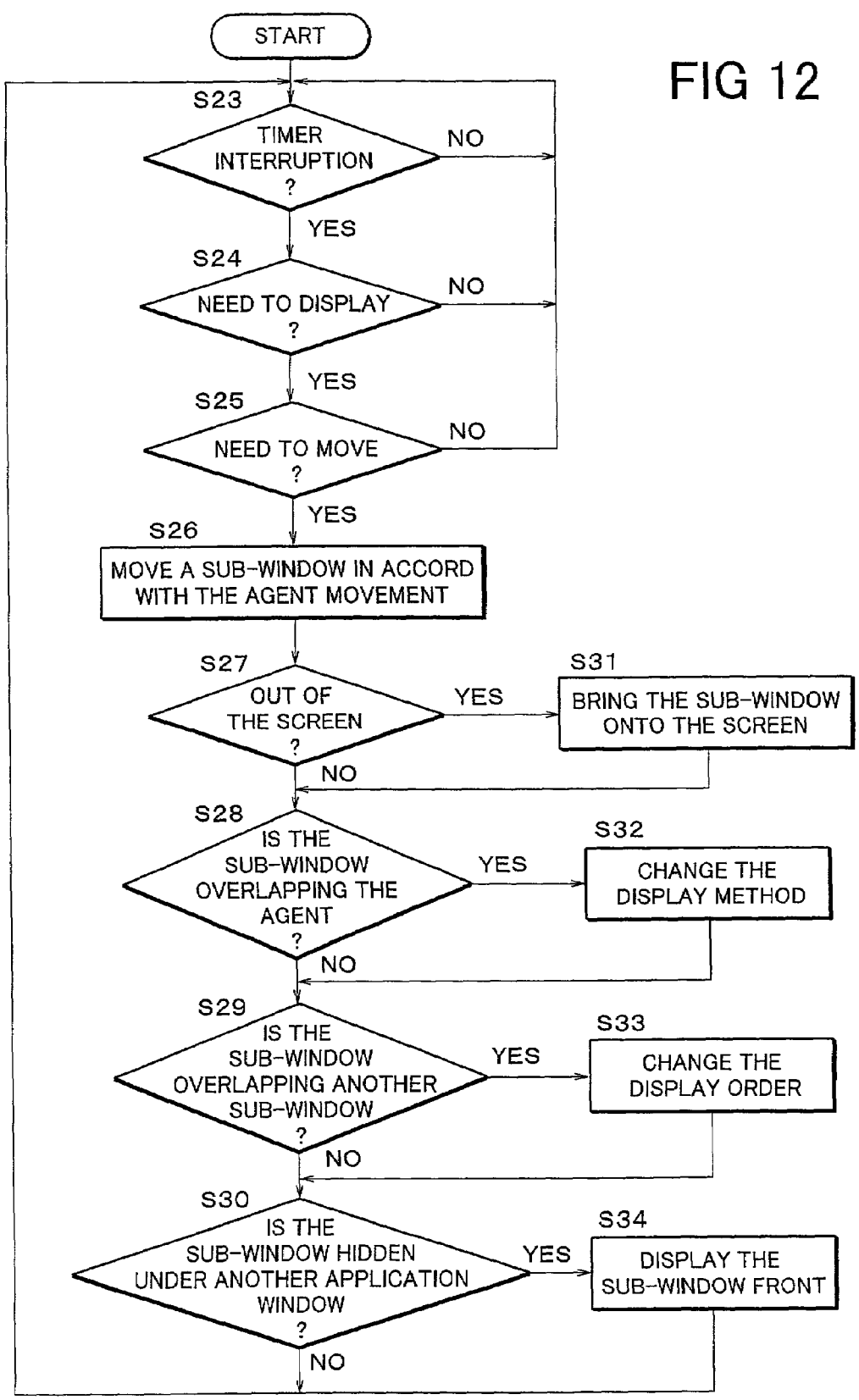
FIG. 12 is a flowchart depicting a procedure for correcting position of a sub-window on a display screen by a voice on-demand interface device according to the present invention.

Embodiments according to the items (7) to (20) of the present invention are described below. FIG. 11 illustrates an example of displaying an agent, a retrieval mode, a voice level and a request text input edit box on a display screen of the output means 7 of the voice on-demand interface device. (a) on FIG. 11 shows an agent separately displayed on the display screen by the agent output means 18. (b) on FIG. 11 shows the case of simultaneously displaying an agent and a retrieval mode outputted by the status output means 34 and (c) on FIG. 11 shows the case of simultaneously displaying an agent, an retrieval mode and a voice level outputted by the voice level output means 35. (d) on FIG. 11 shows the case of simultaneously displaying an agent, a retrieval mode and a request-text edit box outputted by the request text output means 35 instead of the voice level shown in (c) on FIG. 11. This voice on-demand interface device allows the agent to be shifted by the user and to automatically move on the display screen when explaining how to operate the device. The movement of the agent is also accompanied by movements of other relevant sub-windows. FIG. 12 is a flowchart depicting a procedure for realizing the above movements on the display screen. Nothing is done until the timer means 23 generates interrupting signal (Step S23). It is assumed the interrupting signal is generated at intervals of, e.g., 0.1 second. With an interruption from the timer means 23, the control means 5 refers to the sub-window display setting memory means 25 and displays sub-windows that must be displayed and does not display sub-windows that are preset not to be displayed (Step S24). In case of (c) on FIG. 11, the edit box is not displayed, while in case of (d) on FIG. 11, the voice level is not displayed.

Next, each sub-window is examined whether it is preset to move or not to move in the sub-window movement setting means 24. The processing is made to move the movable sub-windows and no processing is made for the non-movable sub-windows (Step S25). For example, when a sub-window of a status indication such as a retrieval mode as shown in (b) on FIG. 11 is desired. to present at a specified relative position in respect to the agent without moving simultaneously with the movement of the agent, it is set not to move. Next, after the agent moved to a new position, the sub-window moving means 22 obtains new current coordinates of the agent and transfers the sub-window "retrieval mode" to its new position predetermined in respective to the agent (Step S26). As shown in (e-1) to (e-3) on FIG. 11, the agent is displayed together with a status indication representing the retrieval mode ((e-1) on FIG. 11) and then moves to a next position ((e-2) on FIG. 11). Now, the sub-window moving means 22 transfers the status indication (sub-window) to a position below the agent ((e-3) on FIG. 11). Next, the sub-window display position correcting means 25 examines whether the sub-window is hidden out of the display screen (Step S27). If the sub-window disappeared out of the screen, the correcting means 25 brings it to the display screen (Step S31). For example, when the status indication was transferred out of the display screen as shown in (f-1) on FIG. 11, it is brought onto the screen by the correcting means 25 as shown in (f-2) on FIG. 11. Then, the main/sub-window position correcting means 27 recognizes whether the sub-window overlapping on the agent (Step S28) and corrects the relative position of the sub-window to eliminate the overlap (Step S32). For example, when the agent and the status indication overlap each other as shown in (f-2) on FIG. 11, the correcting means 27 corrects the location of the status indication and displays the indication at a position where it cannot overlap the agent as shown in (f-3) on FIG. 11.

Alternatively, the window display priority changing means 30 examines whether the sub-window and the agent are overlapping each other (Step S28) and, if so, it decides the priority of displaying the main window and the sub-windows according the order of priorities stored in a memory of the window display priority order setting means 29 (Step S32). For example, when the status indication overlaps the agent as shown in (f-2) on FIG. 11 and the priority of the agent over the status indication is preset in the memory of the window display priority order setting means 29, the status indication is displayed behind the agent as shown in (f-4) on FIG. 11. Since the agent serves as the interface for the user, it is usually displayed with the priority over other sub-windows. However, since the edit box in which the user enters a request text is desirable not to be hidden under the agent as shown in (g-1) on FIG. 11, it may be preset with its display priority over the agent and other sub-windows. The edit box can be displayed on the agent as shown in (g-2) on FIG. 11. The sub/sub-window position correcting means 28 examines whether any sub-window overlaps another sub-window (Step S29) and, if so, then moves one of the sub-windows to a position where it is displayed with no overlap (Step S33). For example, when a status indication is hidden under a volume level indication as shown in (h-1) on FIG. 11, the sub/sub-window position correcting means 28 moves the status indication to a suitable position as shown in (h-2) on FIG. 11. Next, the sub-window front-displaying means 33 examines whether any sub-window is hidden under a window other than the agent and other sub-windows (Step S30) and displays the detected sub-window in front of the window under which it was hidden (Step S34). For example, when a window of another application covers a status indication sub-window as shown in (i-1) on FIG. 11, the sub-window front-displaying means 33 displays the sub-window in front of the application window as shown in (i-2) on FIG. 11. After completion of the correction of sub-window positions, the device waits for a next timer interruption (Step S23).

Figure 13:
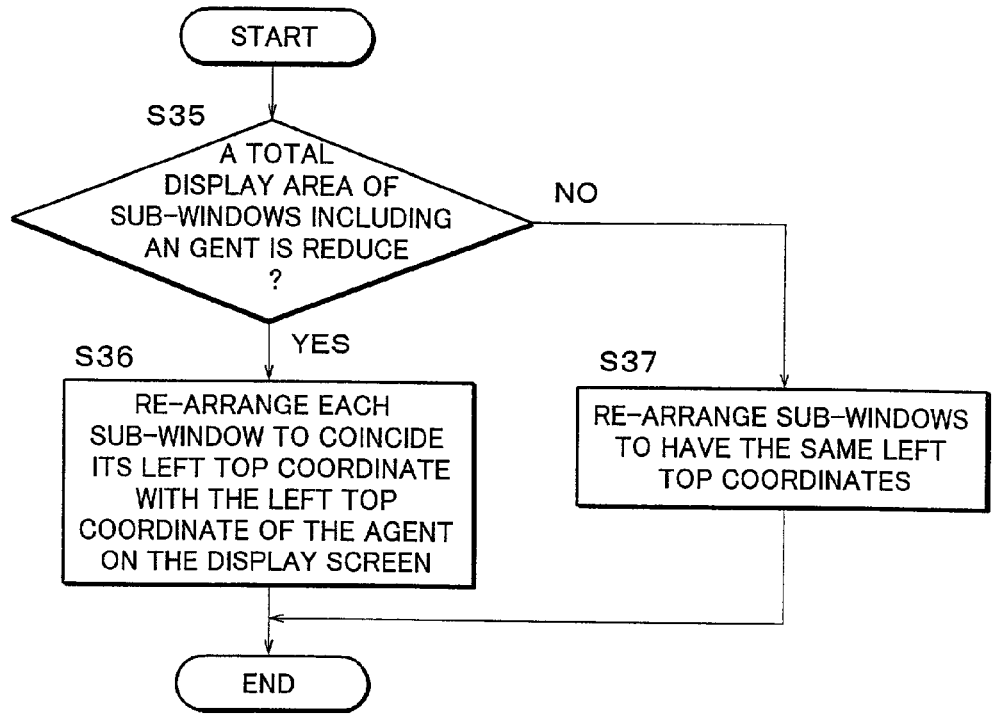
FIG. 13 is a flowchart depicting a procedure for reducing a total display area of windows on a display screen.

If a user feels somewhat excessive presentation of an agent and sub-windows on the display screen of the output means 7, he/she may reduce a total display area of an agent with sub-windows by using the sub-window position correcting means 31 for reducing total display area or a total display area of sub-windows by using the sub-window display area reduction/sub-window position correcting means 32. In FIG. 13, there is shown a flowchart depicting an exemplary procedure for the above operation.

Figure 14:
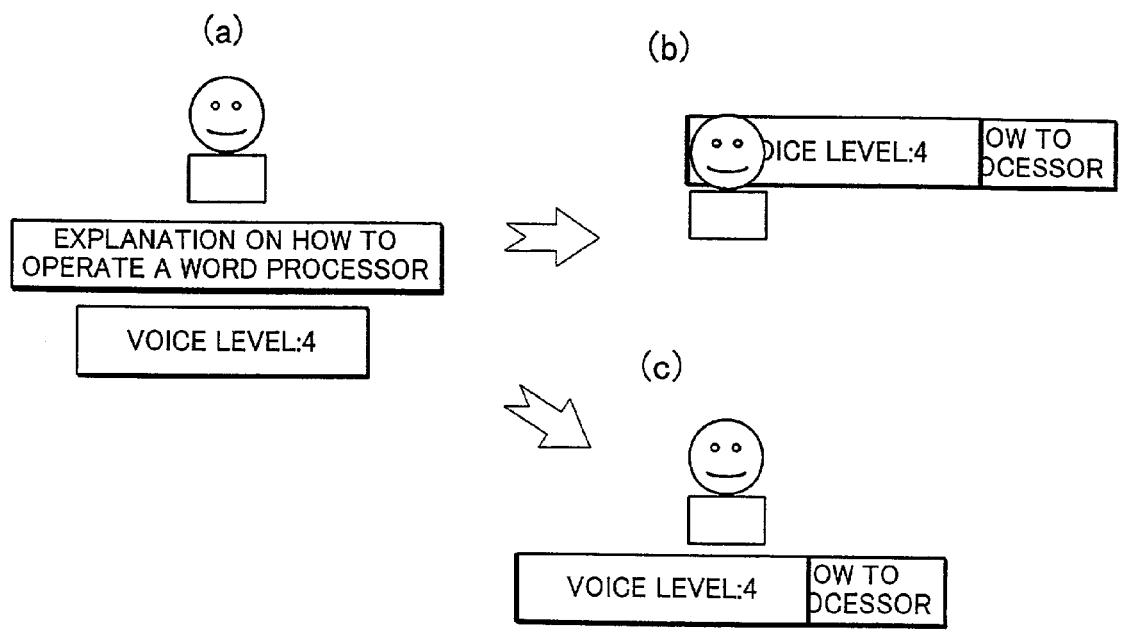
FIG. 14 illustrates an exemplary display of windows on a display screen when the total display area of windows was reduced.

In case of reducing a total display area of sub-windows including an agent (in case of "YES" at decision Step S35), positions of presented sub-windows are corrected so as to coincide the left-top point coordinates of each sub-window with that of the agent (Step S36). In case of reducing a total display area of only presented sub-windows (in case of "NO" at decision Step S35), positions of the sub-windows are corrected in such a way that left-top point coordinates of the sub-windows coincide (Step S37). For example, an agent and two sub-windows are displayed on a display screen as shown in (a) on FIG. 14. To reduce a total display area of the agent with the sub-windows, they are re-arranged as shown in (b) on FIG. 14 by the sub-window position correcting means 31. To reduce a total display area of two sub-windows, they are laid on one another as shown in (c) on FIG. 14 by the sub-window position correcting means 32.

Figure 15:
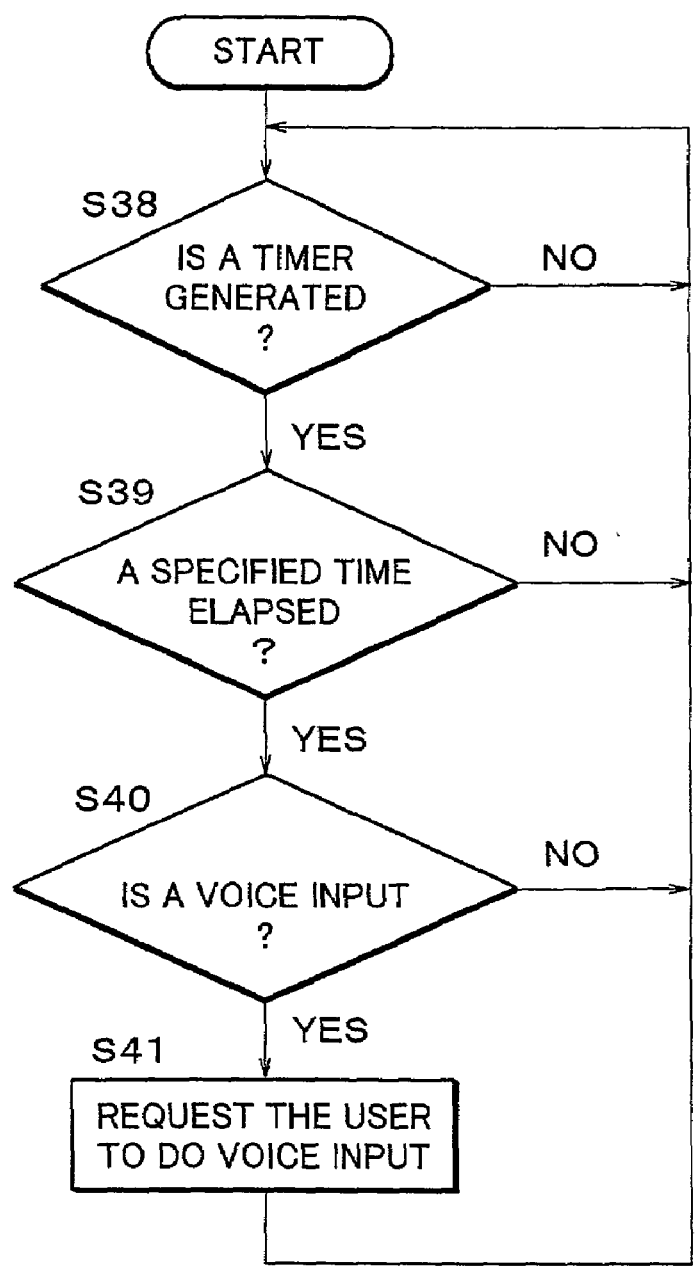
FIG. 15 is a flowchart depicting a procedure for requesting a user to input a speech through a voice on-demand interface device according to the present invention.

An embodiment according to the items (23) and (24) of the present invention is described with reference to FIG. 15 where a flowchart depicting the procedure for the voice input requesting means 38.

With the timer means 23 operating to count time elapsed (Step S38), the control means 5 examines whether the preset time has elapsed by checking the number of count accumulated in timer (Step S39) and, if so, examines whether a voice input was entered to the device through the voice input means 1 for the preset period (Step S40). If no voice was inputted, the control means 5 causes the output means 7 to display a message requesting the user to enter a spoken instruction (Step S41). For example, if no voice was input for 50 seconds from the starting the operation of the voice on-demand interface device, the output means 7 displays on its display screen a message.

"To input a voice instruction, speak by pressing an INPUT START button."

"Please speak a request, for example, "enlarge characters"."

The contents of the above embodiments are illustrative and not restrictive since the scope of the invention is defined by the appended claims.

An information processing system using an on-demand interface device according to the present invention can offer the following advantages:

A device according to the item (1) of the present invention can recognize that no retrieval results were selected n times in succession and, in this case, can advise the user to enroll the voice input means since the fails in retrieval might resulted from the decreased accuracy of the input voice recognition.

A device according to the item (2) of the present invention can randomly select and output one of various responses when nothing (zero) was retrieved, lessening user's uncomfortable feeling by a variety of messages.

A device according to the item (3) of the present invention can recognize that zero-retrieval results were recorded n times in succession and, in this case, can advise the user to enroll the voice input means since the fails in retrieval might resulted from the decreased accuracy of the input voice recognition.

A device according to the item (4) of the present invention can recognize a selected input mode and thus enables the user to start inputting his/her instruction (request) either vocally or other way by pressing one common button or keypad without worrying about selection of different input modes.

A device according to the item (5) of the present invention can cause an agent to move and explain how to operate the device and return to the initial position just after completion of the explanation. The user can clearly recognize the completion of explanation by the agent.

A device according to the item (6) of the present invention can repeat the just executed function when the user requested by vocally inputting a brief instruction "once more" (without inputting the same request text to repeat the preceding retrieval) in such a state that a retrieval result is not displayed and only agent interface is displayed on the display screen.

A device according to the items (7) and (8) of the present invention can move main window together with sub-windows indicating necessary information about the main window on the display screen to always keep the sub-windows in easily readable positions. The above movement of sub-windows can be realized not only when the user externally causes the main window to move but also when the device autonomously moves the main window. Thus, the user does not loss the sight of the sub-windows on the screen.

A device according to the items (9) and (10) of the present invention can dynamically separate any of sub-windows following the main window by making it unmovable or be not displayed on the screen if the user so requested.

A device according to the items (11) to (17) of the present invention can realize adaptive display of a main and sub-windows on the display screen by correcting positions of the main and sub-windows when they disappear out of the display screen or overlap one another or by laying them on one another to reduce a total display area or by disclosing any sub-window hidden under another application window.

A device according to the items (18) to (20) of the present invention can move sub-windows indicating, respectively, a status (current retrieval mode), a volume level (input voice volume level) and an edit box (for inputting a request through a keyboard and the like) to follow the movement of an agent (main interface) on a display screen, thus allowing the user to easily view these sub-windows. Particularly with the agent interface, the above arrangement of sub-windows enables the user to recognize necessary information at a glance since the user speaks to the agent and always put his/her eyes on the agent.

A device according to the item (21) of the present invention can give to the user an explanation on how to vocally input an instruction or a request in case if no retrieval results were selected n times in succession since the fails in retrieval might resulted from poor voice input.

A device according to the item (22) of the present invention can recognize that nothing has been retrieved n times in succession and, in this case, can give to the user an explanation how to input a vocal instruction or a spoken request since the fails in retrieval might resulted from poor or wrong vocal input.

A device according to the items (23) and (24) of the present invention assumes that the user does not know what to input if no voice was inputted by the user for a specified time and, in this case, outputs an message requesting the user to vocally input a request according to the instruction presented therewith. This feature is useful with a beginner-user in the initial period of using the voice on-demand interface device.

What is claimed is:

1. A window display device on a window-system type computer system, for displaying a main window capable of being shifted by a user and autonomously moving according to a program and displaying a sub-window, wherein the window display device comprises a sub-window moving means for moving the sub-window in accordance with movement of the main window so that the sub-window may always keep a specified relative position with respect to the main window on a display screen even if the sub-window is outside the main window and wherein the main window comprises an impersonated character and the sub-window outputs a current operation status.

2. A window display device as defined in claim 1, further comprising a timer for generating an interrupt signal at specified time intervals to cause the sub-window moving means to move the sub-window to a specified position with respect to a current position of the main window based on position data for the main window obtained in response to the interrupt signal.

3. A window display device as defined in claim 1, further comprising sub-window movement setting means capable of setting at least one other sub-window not to move.

4. A window display device as defined in claim 1, further comprising sub-window display setting means capable of setting at least one other sub-window not to be displayed.

5. A window display device as defined in claim 1, further comprising sub-window display position correcting means for correcting a position of the sub-window so that the sub-window is presented within an effective area of the display screen if the sub-window moves over a boundary of the display screen.

6. A window display device as defined in claim 5, further comprising main/sub-window position correcting means for correcting a position of the sub-window so as not to overlap the main window if the sub-window is moved to overlap the main window on the display screen.

7. A window display device as defined in claim 5, further comprising sub/sub-window position correcting means for correcting positions of the sub-window and at least one other sub-window so as not to overlap each other if they are moved to overlap each other.

8. A window display device as defined in claim 5, further comprising sub-window display priority setting means for setting display priorities of the main character and the sub-window, and display-priority changing means for changing display priorities of the main window and the sub-window to the display priorities set by the sub-window display priority setting means when the main window and the sub-window overlap each other.

9. A window display device as defined in claim 7, further comprising total area reduction/sub-window position correcting means for correcting a position of the sub-window so that one or more coordinates of the sub-window coincide with one or more coordinates of the main window so as to reduce a total display area of the main window plus the sub-window.

10. A window display device as defined in claim 1, further comprising sub-window display area reduction/sub-window position correcting means for correcting positions of the sub-window and at least one other sub-window so that these sub-windows are laid on one another so as to reduce a total display area of these sub-windows.

11. A window display device as defined in claim 1, further comprising sub-window front-displaying means for displaying the sub-window in front of any window other than the main window and another sub-window.

12. A window display device on a window-system type computer system, for displaying a main window capable of being shifted by a user and autonomously moving according to a program and displaying a sub-window, wherein the window display device comprises a sub-window moving means for moving the sub-window in accordance with movement of the main window so that the sub-window may always keep a specified relative position with respect to the main window on a display screen, wherein the main window is an impersonated characteragent output means and the sub-window is a status output means for outputting a status representing a current state of an operation mode.

13. A window display device on a window-system type computer system, for displaying a main window capable of being shifted by a user and autonomously moving according to a program and displaying a sub-window, wherein the window display device comprises a sub-window moving means for moving the sub-window in accordance with movement of the main window so that the sub-window may always keep a specified relative position with respect to the main window on a display screen, wherein the window-type computer system further comprises voice input means for inputting a user's speech, and wherein the main window is an output means for outputting an impersonated character-agent and the sub-window is a voice level output means for indicating a volume level of speech inputted to the voice input means.

14. A window display device on a window-system type computer system, for displaying a main window capable of being shifted by a user and autonomously moving according to a program and displaying a sub-window, wherein the window display device comprises a sub-window moving means for moving the sub-window in accordance with movement of the main window so that the sub-window may always keep a specified relative position with respect to the main window on a display screen, wherein the main window is an output means for outputting an impersonated character-agent and the sub-window is an input request-text display means for displaying content of input request-text and an input cursor so that the user can input the requested text.

15. A window display control system for a computer system, the window display control system displaying a movable main window for an application and a sub-window for the application, wherein the window display control system moves the sub-window in dependence on movement of the main window even if the sub-window is outside the main window and wherein the main window comprises an impersonated character and the sub-window outputs current operation status.

16. A computer system comprising a window display control system according to claim 15.

17. A window display method comprising:
   displaying a main window for an application and a sub-window for the application on a display device; and
   moving the sub-window in accordance with movement of the main window even if the sub-window is outside the main window, wherein
   the main window comprises an impersonated character and the sub-window outputs current operation status.

18. A window display control system for a computer system, the window display control system displaying a movable impersonated character and a status indicating sub-window, wherein the window display control system moves the status indicating sub-window in dependence on movement of the impersonated character to maintain a specified relationship therebetween.

19. A window display control system for a computer system, the window display control system displaying a movable impersonated character and a volume level indicating sub-window for indicating a volume level of a voice input to the computer system, wherein the window display control system moves the volume level indicating sub-window in dependence on movement of the impersonated character to maintain a specified relationship therebetween.

20. A window display control system for a computer system, the window display control system displaying a movable impersonated character and a text input sub-window for inputting text to the computer system, wherein the window display control system moves the text input sub-window in dependence on movement of the impersonated character to maintain a specified relationship therebetween.

* * * * *